United States Patent

[11] 3,594,559

[72] Inventor Troy J. Pemberton
 Bartlesville, Okla.
[21] Appl. No. 740,251
[22] Filed June 26, 1968
[45] Patented July 20, 1971
[73] Assignee Phillips Petroleum Company

[54] PROCESS CONTROL FOR POLYMERIZATION CONTROL SYSTEM HAVING EQUATION UPDATING FEEDBACK NETWORKS
6 Claims, 2 Drawing Figs.

[52] U.S. Cl. .................................................. 235/151.12,
 235/150.1, 235/181, 260/94.9 R
[51] Int. Cl. ..................................................... G06g 7/58
[50] Field of Search ............................................. 235/151.12,
 151, 151.1, 150.1, 150.5, 150.51, 150.52, 150.53,
 194, 183, 181; 260/94.3, 94.2, 94.9, 698, 699,
 700; 340/15.5; 324/77

[56] References Cited
UNITED STATES PATENTS
3,078,265 2/1963 Berger et al. ................... 235/151.12 X
3,254,071 5/1966 Morgan et al. ................. 235/151.12 UX
3,275,809 9/1966 Tolin et al. ..................... 235/151.12
3,421,141 1/1969 Meyerhoff ....................... 235/181 X Primary Examiner—Malcolm A. Morrison
Assistant Examiner—Joseph F. Ruggiero
Attorney—Young and Quigg ABSTRACT: Emperical equations of type $Y = A_1 X_1 + A_2 X_2 + ... + A_n X_n$, employed in automatic control systems, are updated continuously in response to measurements of the process being controlled. The updating is accomplished by a computer having feedback networks. The equation updating network is employed in a polymerization control system.

PROCESS CONTROL FOR POLYMERIZATION CONTROL SYSTEM HAVING EQUATION UPDATING FEEDBACK NETWORKS

Increasing industrial use is currently being made of rather complex control systems, many of which utilize some type of computer to calculate desired operating conditions from a plurality of input signals. In order to design a control system of this type, it is necessary to have a mathematical model of the process. This model is usually in the form of an empirical equation which has been derived from a study of operating data relating to the process. Equations of this type are often of the general form $Y = A_1X_1 + A_2X_2 + A_3X_3 + \ldots + A_nX_n$, where $Y$ is a dependent variable and the $X$'s are independent variables which can be measured in the process. For example, in a simple polymerization process, the term $Y$ can represent the reaction rate, and the variables $X_1$, $X_2$ and $X_3$ can represent monomer feed rate, catalyst feed rate and a constant representing background poisons, respectively. The $A$ coefficients in such an equation are usually estimated or derived mathematically from operating data. However, any given equation of this type is generally an approximation of a description of the process under average conditions. Since most processes are subject to various upsets and changing conditions, it is necessary to revise the coefficients of the equations periodically if a reasonably accurate model is to be maintained.

In accordance with the present invention, a system is provided for updating process models automatically by adjusting coefficients in response to changes in operating conditions of the process.

Accordingly, it is an object of this invention to provide a method of updating equations which describe the operation of a process.

Another object is to provide apparatus for adjusting the coefficients in an equation which is employed in a control system.

A further object is to provide a system for controlling polymerization processes.

Other objects, advantages and features of the invention should become apparent from the following detailed description, taken in conjunction with the accompanying drawing in which.

Figure 1:
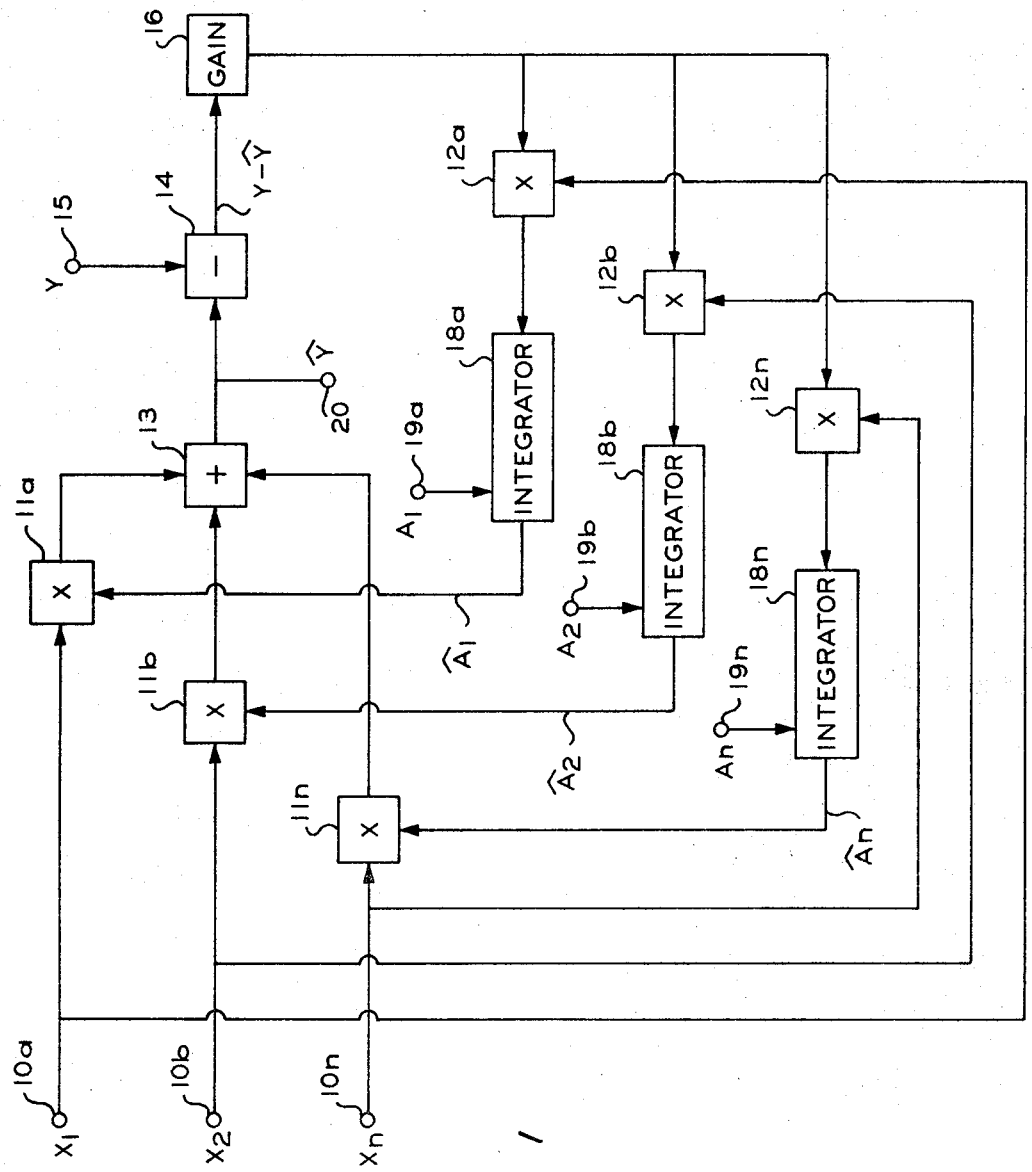
FIG. 1 is a schematic representation of an embodiment of the equation adjusting apparatus of this invention.

Referring now to the drawing in detail and to FIG. 1 in particular, there is shown a system which is adapted to adjust the coefficients of an equation of the general form $Y = A_1X_1 + A_2X_2 + \ldots + A_nX_n$. The independent variables $X_1, X_2 \ldots X_n$ are represented by input signals which appear at respective terminals $10a, 10b \ldots 10n$. These input terminals are connected to the first inputs of respective signal multipliers $11a, 11b \ldots 11n$. Input terminals $10a, 10b \ldots 10n$ are also connected to first input terminals of respective signal multipliers $12a, 12b \ldots 12n$. The outputs of multipliers $11a, 11b \ldots 11n$ are applied to respective inputs of a signal summing device 13. The output of summing device 13 is applied to one of the inputs of a signal-subtracting device 14. A signal representing the dependent variable $Y$ is applied to an input terminal 15 which is connected to the second input of subtracting device 14. The output from subtracting device 14, which is representative of the difference between signal Y and the summed output of device 13, is applied through a gain adjusting means 16 to the second inputs of signal multipliers $12a, 12b \ldots 12n$. The outputs of these multipliers are applied through respective signal integrators $18a, 18b \ldots 18n$ to the second inputs of respective multipliers $11a, 11b \ldots 11n$. The integrators are provided with initial input signals which are representative of the coefficients of the equation to be updated. To this end, input terminals $19a, 19b \ldots 19n$ supply signals $A_1, A_2 \ldots A_n$ to respective integrators $18a, 18b \ldots 18n$.

The apparatus of FIG. 1 serves to update the estimated values of the coefficients $\hat{A}_1, \hat{A}_2, \ldots \hat{A}_n$ as to minimize the squared-error $$(Y - \hat{Y})^2,$$

where $$\hat{Y} = \hat{A}_1X_1 + \hat{A}_2X_2 + \ldots + \hat{A}_nX_n$$

In these equations the symbol "^" designates the estimated values of the respective variables with which this symbol is associated. In the simple polymerization example mentioned above, the values of monomer feed rate, catalyst feed rate and a constant representing catalyst poison rate are applied to the respective input terminals 10. The actual control system for the process computes polymer production rate. This can be accomplished, for example from a computation of the heat generated in the reactor by the exothermic polymerization reaction. The computed signal representative of the polymer production rate is supplied to input terminal 15. An output signal $\hat{Y}$, which appears at a terminal 20, can be employed for control purposes. This signal is used in place of the computed production rate signal, the difference being that signal $\hat{Y}$ is updated by use of compensated coefficients $\hat{A}_1, \hat{A}_2 \ldots \hat{A}_n$.

Figure 2:
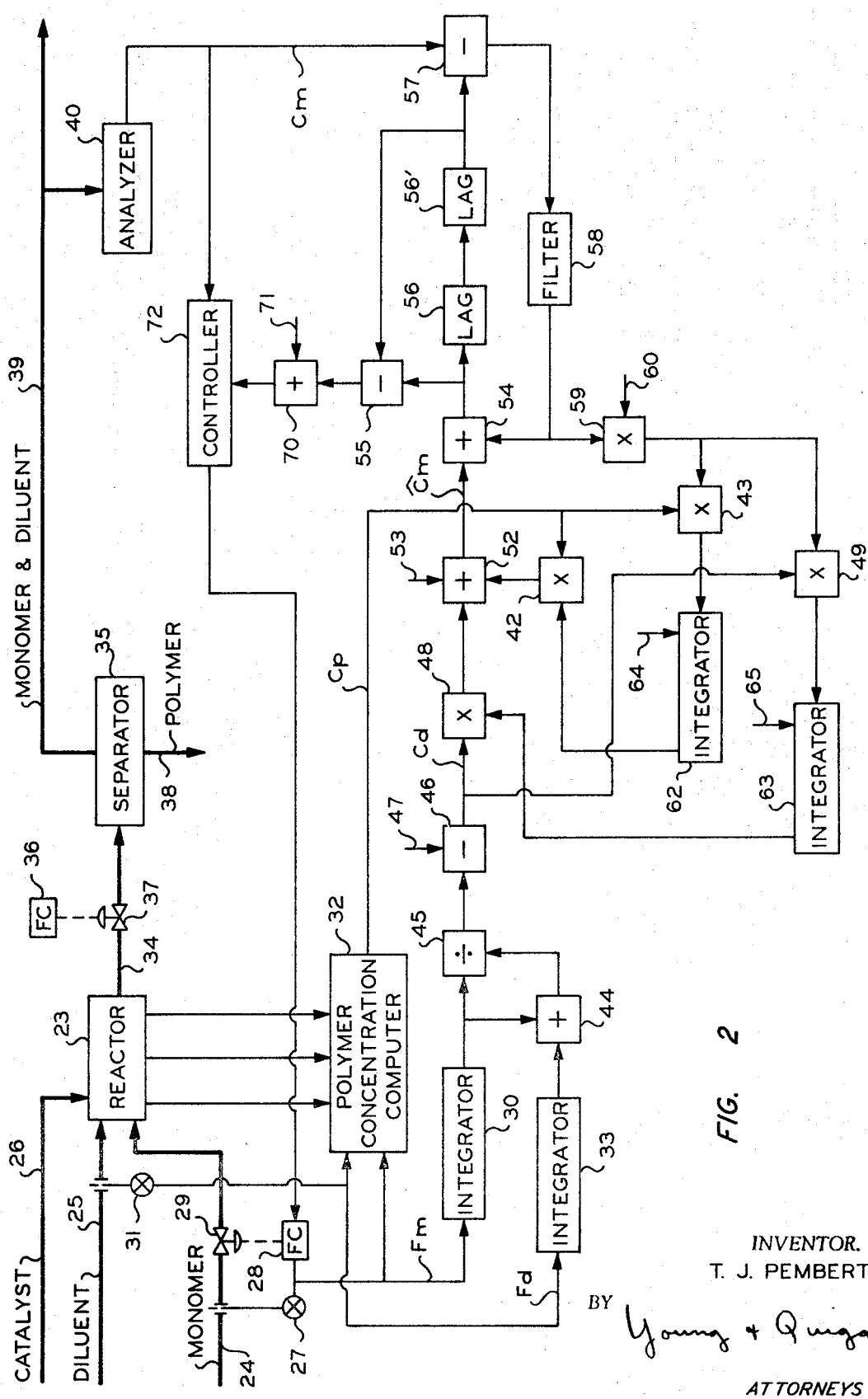
FIG. 2 is a schematic representation of a control system for a polymerization reaction which employs the apparatus of this invention.

IN FIG. 2, the equation updating computer of this invention is employed in a control system for a polymerization process. In the polymerization process, a monomer or mixture of monomers, diluent and catalyst are introduced into a reactor 23 through respective conduits 24, 25 and 26. The process can be one in which an olefin or a mixture of olefins is polymerized, such as described in U.S. Pat. No. 2,825,721 or Belgian Pat. No. 591,527, for example. Monomer conduit 24 is provided with a flow sensing transducer 27 which establishes an output signal $F_m$ which is representative of the rate of flow of monomer into reactor 23. This signal is applied to a flow controller 28 which regulates a valve 29 in conduit 24, and is also applied to the input of an integrator 30 and to polymer concentration computer 32. Conduit 25 is provided with a flow transducer 31 which establishes a signal $F_d$ which is representative of the rate of flow of diluent into the reactor. This signal is applied to an input of a polymer concentration computer 32 and to the input of an integrator 33. The reactor effluent is removed through a conduit 34 which communicates with the inlet of a separator 35. Conduit 34 is provided with a suitable controller 36 which adjusts a valve 37 to maintain a desired controlled condition in reactor 23. Polymer is separated from the reactor effluent in separator 35 and removed through an outlet 38. The unreacted monomer and diluent are removed from separator 35 through a conduit 39. A sample of this stream is directed to an analyzer 40 which establishes an output signal $C_m$ which is representative of the concentration of monomer in effluent stream 39. A chromatographic analyzer can be used for this purpose.

Polymer concentration computer 32 is employed to provide an output signal $C_p$ which is representative of the concentration of polymer within reactor 23. This polymer concentration computer can be of the type described in U.S. Pat. No. 2,974,017 if the polymerization reactor is of the type described therein. The diluent stream in FIG. 2 corresponds to the stream designated "solvent" in the patent. Polymer concentration computer 32 is provided with a plurality of signals which represent various operating conditions of the reactor, as described in detail in the patent. If a loop reactor is employed, the computer can be simplified by the elimination of certain of the equations described in U.S. Pat. No. 2,974,017, such as equations (3) and (5) therein. The output signal $C_p$ from computer 32 is applied to first inputs of signal multipliers 42 and 43. These multipliers correspond to respective elements $11a$ and $12a$ of FIG. 1. The signal $C_p$ corresponds to signal $X_1$ of FIG. 1.

The output signals from integrators 30 and 33 are applied to the inputs of a signal adder 44, the output of which is applied to an input of a signal divider 45. The output from integrator 30 is also applied to divider 45, and is therein divided by the output from adder 44. The output signal from divider 45 is applied to the input of a signal-subtracting device 46. A reference signal 47, which is representative of 100 percent, is also applied to subtracting device 46. The output signal $C_d$ from device 46 is applied to inputs of multipliers 48 and 49. These two multipliers correspond to respective elements 11b and 12b of FIG. 1, and signal $C_d$ corresponds to signal $X_2$.

Integrators 30 and 33 provide output signals which represent the average flow rates through respective conduits 24 and 25. The outputs signal from divider 45 is representative of the amount (weight) of monomer in the reactor feed. This signal is subtracted from 100 percent such that signal $C_d$ is representative of the concentration of diluent in both the feed to, and the effluent from, reactor 23. The output signals from multipliers 48 and 42 are applied as respective inputs to a summing and subtracting device 52 which corresponds to device 13 of FIG. 1. A third input signal 53, which is representative of 100 percent is also applied to device 52. The output signal $\check{C}_m$ from device 52 is equal to the quantity "one minus the sum of the output signal from multipliers 48 and 42." This signal is applied to a signal adder 54 as a corrective bias thereto. The output signal from adder 54 is applied to a signal subtractor 55 and is transmitted through lagging networks 56 and 56′ to the input of a signal comparing (subtracting) device 57. The output signal from analyzer 40 is also applied to device 57. An output signal, representative of the difference between the two input signals, is transmitted from device 57 through a smoothing filter 58 to the input of adder 54 and to the first input of a signal multiplier 59. The second input signal 60 to multiplier 59 is representative of the quantity +2. Device 57 serves to compare the predictively computed value of monomer concentration within the reactor with the actual measured monomer concentration in the reactor effluent, and the difference, if any, is added to the computed value by device 54. As will be described hereinafter in greater detail, lagging networks 56 and 56′ are employed to compensate for the time lag which results from the flow of monomer through the separation system and the time lag in analyzer 40. Filter 58 is merely a smoothing device to minimize minor fluctuations.

The output signal from multiplier 59 is applied to the second inputs of multipliers 43 and 49. The outputs of these two multipliers are applied through respective integrators 62 and 63 to the second inputs of respective multipliers 42 and 48. Integrators 62 and 63 are adapted to have initial input signals 64 and 65, respectively, applied thereto.

The second input to signal subtracting device 55 is the output from lagging network 56′. The output signal from device 55, which is representative of the different between the signals from elements 54 and 56, is applied as bias to the first input of a summing device 70, the second input signal 71 thereto being a set point signal representative of the desired monomer concentration in reactor 23. The output signals from analyzer 40 and summing device 70 are applied to the respective inputs of a controller 72, the measurement input signal being the analyzer output and the set point signal being the signal from device 70. The output of controller 72 serves to provide the set point to flow controller 28 to regulate the rate of monomer introduced into reactor 23.

Lagging means 56 and 56′ can be any type of devices which are capable of solving the following typical equations:

$$Y_1 = \frac{K_1}{S_1(\tau_1 S + 1)(\tau_2 S + 1)}(X) \quad (1)$$

$$Y_2 = \frac{K_2}{S_2(\tau_3 S + 1)(\tau_4 S + 1)}(Y_1) \quad (2)$$

where $Y_1$ is the LaPlace transform of the output signal from means 56, $X$ is the input signal to means 56, $Y_2$ is the LaPlace transform of the output signal from means 56′, and $K_1$ and $K_2$ are constants. $\tau_1$ and $\tau_2$ are time constants corresponding to actual time lag and time constant of the processing equipment between reactor 23 and analyzer 40. $\tau_3$ and $\tau_4$ are time constants corresponding to analyzer 40. $S_1$ represents pure dead time in the processing equipment, and $S_2$ represents pure dead time in analyzer 40. $S$ is the LaPlace operator. For further details as to the derivation and automatic control theory for the aforementioned equations, reference s made to "Principles of Feedback Control" by Charles Wilts, Addison-Wesley 10, 1960. These lag means can be conventional analog or digital computing devices which are compatible with the other elements of the computing equipment.

Whereas the above description of this invention has been made with respect to sampling the effluent stream from the reactor and analyzing such stream to determine the monomer concentration, it is within the scope of the invention to analyze a sample of the reaction mixture itself. In this situation, a sample of material withdrawn from reactor 23 is passed directly to analyzer 40. This results in the elimination of lagging device 56 or a modification of this device in accordance with any process lag between the sample point and the analyzer.

Under steady-state operating conditions, the computed concentration of monomer in reactor 23 is equal to the monomer concentration detected by analyzer 40 when proper calibration factors are employed. As such, the two signals to subtractor 57 are the same. Similarly, the two signals to subtractor 55 are the same, with the result that there is no error signal added to the set point signal in summing device 70. As such, controller 72 compares set point signal 71 with the output of analyzer 40 and ultimately controls valve 29 in accordance therewith. If the reactor should be upset, such as by the introduction of a catalyst poison into the reactor, the polymer production rate will decrease and the monomer concentration within the reactor will increase. The net result is that the signal $C_m$ to device 57 will increase, and this in turn will increase the magnitude of the output signal from device 57. Since the signal transmitted through lagging devices 56 and 56′ is delayed, there will be an output signal from subtractor 55 applied to summing device 70. This serves to modify the set point to controller 72 to decrease the flow of monomer into the reactor. The foregoing correction occurs before a change in monomer concentration is detected by analyzer 40. The prompt correction of monomer feed rate to compensate for the catalyst poison thus tends to maintain a steady monomer concentration. If proper corrective action is taken promptly, the change eventually sensed by analyzer 40 will be minimized. Conversely, a decrease in monomer concentration will result in the control system operating in opposite manner. When steady state conditions are once again obtained, the two signals applied to subtractor 55 will again be the same.

It should be evident that the various elements of the illustrated control systems can be electrical or pneumatic devices known in the art. Various configurations of electronic analog computing elements are described in *Electronic Analog Computers*, Korn and Korn, McGraw-Hill Book Company, Inc., New York, 1956, for example. The computations can be made by an analog computer of the type illustrated, or by means of a digital computer.

While this invention has been described in conjunction with presently preferred embodiments, it should be evident that it is not limited thereto.

What I claim is:

1. In a polymerization system wherein monomer, diluent and catalyst are introduced into a polymerization reactor and polymer, unreacted monomer and diluent are removed from the reactor, control apparatus comprising:
   means to compute the concentration of polymer within the reactor and establish a first signal representative of such computed polymer concentration;
   means to establish a second signal representative of the concentration of diluent within the reactor;
   means to measure the concentration of monomer in the reactor effluent and to establish a third signal representative thereof;

first, second, third and fourth signal multipliers, each having first and second inputs and an output;
means applying said first signal to the first inputs of said first and third signal multipliers;
means applying said second signal to the first inputs of said second and fourth signal multipliers;
signal-adding means having first and second inputs and an output;
means connecting the outputs of said first and second signal multipliers to the respective first and second inputs of said signal-adding means;
signal-subtracting means having first and second inputs and an output;
means applying said third signal to the first input of said signal-subtracting means;
means connecting the output of said signal adding means to the second input of said signal subtracting means;
means connecting the output of said signal subtracting means to the second inputs of said third and fourth signal multipliers;
first and second integrators, each having an input and an output;
means connecting the outputs of said third and fourth signal multipliers to the respective inputs of said first and second integrators;
means connecting the outputs of said first and second integrators to the respective second inputs of said first and second signal multipliers; and
means responsive to the output signal from said signal adding means and said third signal to control the operation of said reactor.

2. The apparatus of claim 1 wherein said means to control the operation of said reactor comprises means to regulate the rate at which monomer is introduced into said polymerization reactor.

3 The apparatus of claim 1 wherein said means connecting the output of said signal adding means to the second input of said signal subtracting means and said means to control the operation of said reactor comprise:
a second signal-adding means having first and second inputs and an output;
means connecting the output of the first-mentioned signal-adding means to the first input of said second signal-adding means;
signal-lagging means;
means connecting the output of said second signal-adding means through said lagging means to the second input of said signal-subtracting means;
signal filter means;
means connecting the output of said signal-subtracting means through said filter means to the second input of said second signal-adding means;
second signal-subtracting means having first and second inputs and an output;
means connecting the output of said second signal-adding means to the first input of said second signal-subtracting means;
means applying the output signal from said lagging means to the second input of said second signal subtracting means;
a controller having an input and a set point;
means applying said third signal to the input of said controller; and
means connecting the output of said second signal-subtracting means to the set point of said controller.

4. The apparatus of claim 3 wherein said means connecting the output of said second signal subtractor comprises a third signal-adding means having first and second inputs and an output;
means connecting the output of said second subtracting means to the first input of said third adding means;
means applying a reference signal to the second input of said third adding means; and
means connecting the output of said third adding means to the set point of said controller.

5. The apparatus of claim 3, further comprising a fifth signal-multiplying means having first and second inputs and an output;
means connecting the output of said filter to the first input of said fifth multiplier;
means applying a reference signal to the second input of said fifth multiplier; and
means connecting the output of said fifth multiplier to the second inputs of said third and fourth signal multipliers.

6. The apparatus of claim 1 wherein said means to establish said second signal comprises means to establish a fourth signal representative of the rate of flow of monomer to said reactor;
means to establish a fifth signal representative of the rate of flow of dilvent to said reactor;
third and fourth integrators, each having an input and an output;
second signal-adding means having first and second inputs and an output;
signal-dividing means having first and second inputs and an output;
second signal-subtracting means having first and second inputs and an output;
means applying said fourth signal to the input of said third integrator;
means applying said fifth signal to the input of said fourth integrator;
means connecting the output of said third integrator to first inputs of said second adding means and said dividing means;
means connecting the output of said fourth integrator to the second input of said dividing means;
means connecting the output of said second adding means to the second input of said dividing means;
means applying a reference signal to the first input of said second subtracting means; and
means connecting the output of said dividing means to the second input of said second subtracting means, the output of said second subtracting means being said second signal.